United States Patent
Roberson

(10) Patent No.: US 6,588,265 B1
(45) Date of Patent: Jul. 8, 2003

(54) AUTOMATIC TIRE GAUGE

(76) Inventor: Gregory J. Roberson, 3200 Dublin Rd., Charlotte, NC (US) 28208

( * ) Notice: Subject to any disclaimer, the term of this patent is extended or adjusted under 35 U.S.C. 154(b) by 0 days.

(21) Appl. No.: 10/099,026

(22) Filed: Mar. 15, 2002

(51) Int. Cl.[7] ............................................. B60C 23/02
(52) U.S. Cl. .................. 73/146.8; 73/146; 73/146.3
(58) Field of Search ................... 73/146–146.8

(56) References Cited

U.S. PATENT DOCUMENTS

| | | |
|---|---|---|
| 4,581,925 A | 4/1986 | Crutcher |
| 4,793,177 A | 12/1988 | Wu et al. |
| 4,924,697 A | 5/1990 | Hunt et al. |
| 4,953,395 A | 9/1990 | Jard |
| 5,103,670 A | 4/1992 | Wu et al. |
| D336,735 S | 6/1993 | Nulsen |
| 5,886,254 A * | 3/1999 | Chi ........................... 73/146.8 |
| 5,979,232 A * | 11/1999 | Halcomb ................... 116/34 R |
| 6,055,854 A * | 5/2000 | Chen ......................... 73/146.8 |

* cited by examiner

Primary Examiner—Hezron Williams
Assistant Examiner—Jermaine Jenkins

(57) ABSTRACT

An automatic tire gauge for indicating levels of air pressure within a tire. The inventive device includes a cylindrical housing having a closed upper end an open lower end. The open lower end is internally threaded for mating with external threads on a standard tire valve stem. An outer portion of the cylindrical housing is transparent. A mounting bracket is disposed inwardly of the open lower end of the cylindrical housing. The mounting bracket has a protrusion extending downwardly therefrom for contacting a valve needle of the standard tire valve stem. A calibrated spring is secured to and extends upwardly from the mounting bracket. The spring has a calibrated tension corresponding to a specific tire pressure. A pressure indicator is secured to an upper free end of the calibrated spring. The pressure indicator comprises a cylindrical member disposed interiorly of the cylindrical housing. The cylindrical member has pressure indicating indicia thereon. The cylindrical member is biased upwardly in an extended orientation for being viewed through the transparent outer portion when the tire is properly pressurized.

8 Claims, 3 Drawing Sheets

AUTOMATIC TIRE GAUGE

BACKGROUND OF THE INVENTION

1. Field of the Invention

The present invention relates to air pressure valves and gauges and more particularly pertains to a new automatic tire gauge for indicating levels of air pressure within a tire.

2. Description of the Prior Art

The use of air pressure valves and gauges is known in the prior art. More specifically, air pressure valves and gauges heretofore devised and utilized are known to consist basically of familiar, expected and obvious structural configurations, notwithstanding the myriad of designs encompassed by the crowded prior art which have been developed for the fulfillment of countless objectives and requirements.

Known prior art air pressure valves and gauges include U.S. Pat. No. 4,793,177 to Wu et al.; U.S. Pat. No. 5,130,670 to Wu et al.; U.S. Pat. No. Des. 336,735 to Nulsen; U.S. Pat. No. 4,924,697 to Hunt et al.; U.S. Pat. No. 4,953,395 to Jard; and U.S. Pat. No. 4,581,925 to Crutcher.

While these devices fulfill their respective, particular objectives and requirements, the aforementioned patents do not disclose a new automatic tire gauge. The inventive device includes a cylindrical housing having a closed upper end an open lower end. The open lower end is internally threaded for mating with external threads on a standard tire valve stem. An outer portion of the cylindrical housing is transparent. A mounting bracket is disposed inwardly of the open lower end of the cylindrical housing. The mounting bracket has a protrusion extending downwardly therefrom for contacting a valve needle of the standard tire valve stem. A calibrated spring is secured to and extends upwardly from the mounting bracket. The spring has a calibrated tension corresponding to a specific tire pressure. A pressure indicator is secured to an upper free end of the calibrated spring. The pressure indicator comprises a cylindrical member disposed interiorly of the cylindrical housing. The cylindrical member has pressure indicating indicia thereon. The cylindrical member is biased upwardly in an extended orientation for being viewed through the transparent outer portion when the tire is properly pressurized.

In these respects, the automatic tire gauge according to the present invention substantially departs from the conventional concepts and designs of the prior art, and in so doing provides an apparatus primarily developed for the purpose of indicating levels of air pressure within a tire.

SUMMARY OF THE INVENTION

In view of the foregoing disadvantages inherent in the known types of air pressure valves and gauges now present in the prior art, the present invention provides a new automatic tire gauge construction wherein the same can be utilized for indicating levels of air pressure within a tire.

The general purpose of the present invention, which will be described subsequently in greater detail, is to provide a new automatic tire gauge apparatus and method which has many of the advantages of the air pressure valves and gauges mentioned heretofore and many novel features that result in a new automatic tire gauge which is not anticipated, rendered obvious, suggested, or even implied by any of the prior art air pressure valves and gauges, either alone or in any combination thereof.

To attain this, the present invention generally comprises a cylindrical housing having a closed upper end and an open lower end. The open lower end is internally threaded for mating with external threads on a standard tire valve stem. An outer portion of the cylindrical housing is transparent. An inner portion has a first color shade on an exterior surface thereof. A mounting bracket is disposed inwardly of the open lower end of the cylindrical housing. The mounting bracket has a protrusion extending downwardly therefrom for contacting a valve needle of the standard tire valve stem. A calibrated spring is secured to and extends upwardly from the mounting bracket. The spring has a calibrated tension corresponding to a specific tire pressure. A pressure indicator is secured to an upper free end of the calibrated spring. The pressure indicator is comprised of a cylindrical member disposed interiorly of the cylindrical housing. The cylindrical member has a second shade of color disposed thereon. The cylindrical member is biased upwardly in an extended orientation for being viewed through the transparent outer portion when the tire is properly pressurized. The cylindrical member descends within the cylindrical housing when the tire is not properly pressurized thereby exposing the first shade of color of the cylindrical housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automatic tire gauge apparatus and method which has many of the advantages of the air pressure valves and gauges mentioned heretofore and many novel features that result in a new automatic tire gauge which is not anticipated, rendered obvious, suggested, or even implied by any of the prior art air pressure valves and gauges, either alone or in any combination thereof.

It is another object of the present invention to provide a new automatic tire gauge which may be easily and efficiently manufactured and marketed.

It is a further object of the present invention to provide a new automatic tire gauge which is of a durable and reliable construction.

An even further object of the present invention is to provide a new automatic tire gauge which is susceptible of a low cost of manufacture with regard to both materials and labor, and which accordingly is then susceptible of low prices of sale to the consuming public, thereby making such automatic tire gauge economically available to the buying public.

Still yet another object of the present invention is to provide a new automatic tire gauge which provides in the apparatuses and methods of the prior art some of the advantages thereof, while simultaneously overcoming some of the disadvantages normally associated therewith.

Still another object of the present invention is to provide a new automatic tire gauge for indicating levels of air pressure within a tire.

Yet another object of the present invention is to provide a new automatic tire gauge which includes a cylindrical housing having a closed upper end an open lower end. The open lower end is internally threaded for mating with external threads on a standard tire valve stem. An outer portion of the cylindrical housing is transparent. A mounting bracket is disposed inwardly of the open lower end of the cylindrical housing. The mounting bracket has a protrusion extending downwardly therefrom for contacting a valve needle of the standard tire valve stem. A calibrated spring is secured to and extends upwardly from the mounting bracket. The spring has a calibrated tension corresponding to a specific tire pressure. A pressure indicator is secured to an upper free end of the calibrated spring. The pressure indicator comprises a cylindrical member disposed interiorly of the cylindrical housing. The cylindrical member has pressure indicating indicia thereon. The cylindrical member is biased upwardly in an extended orientation for being viewed through the transparent outer portion when the tire is properly pressurized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
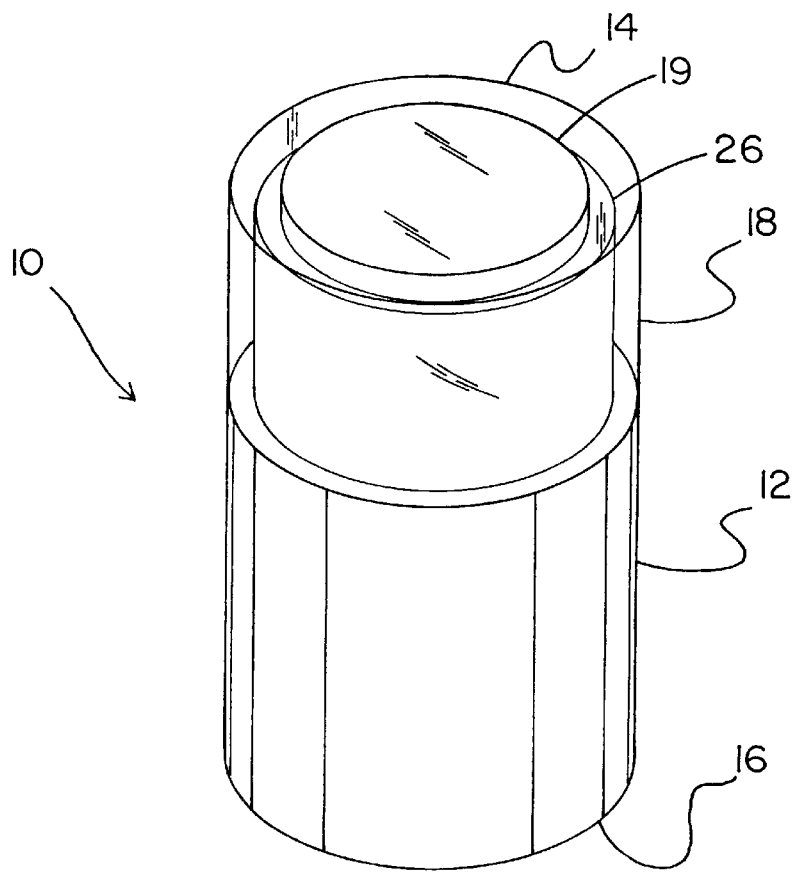
FIG. 1 is a perspective view of a new automatic tire gauge according to the present invention illustrated in with proper tire pressure.
Figure 2:
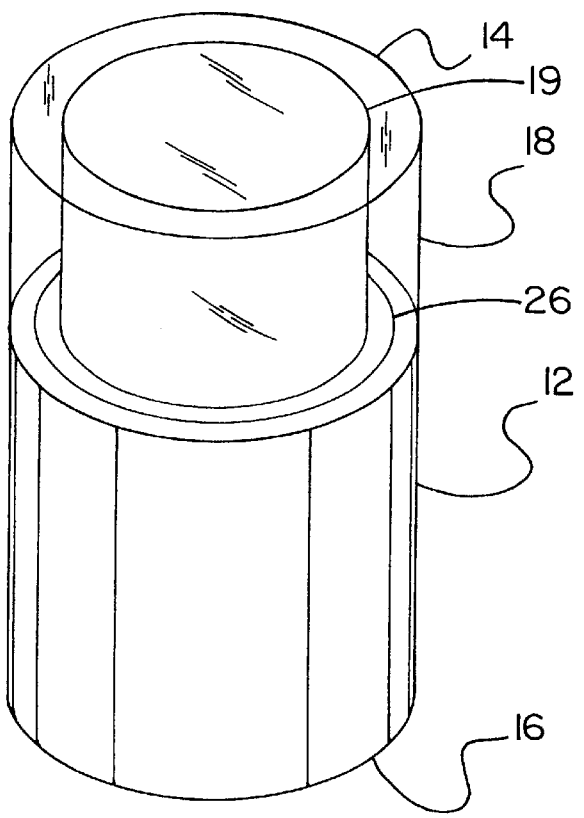
FIG. 2 is a perspective view of the present invention illustrated without proper tire pressure.
Figure 3:
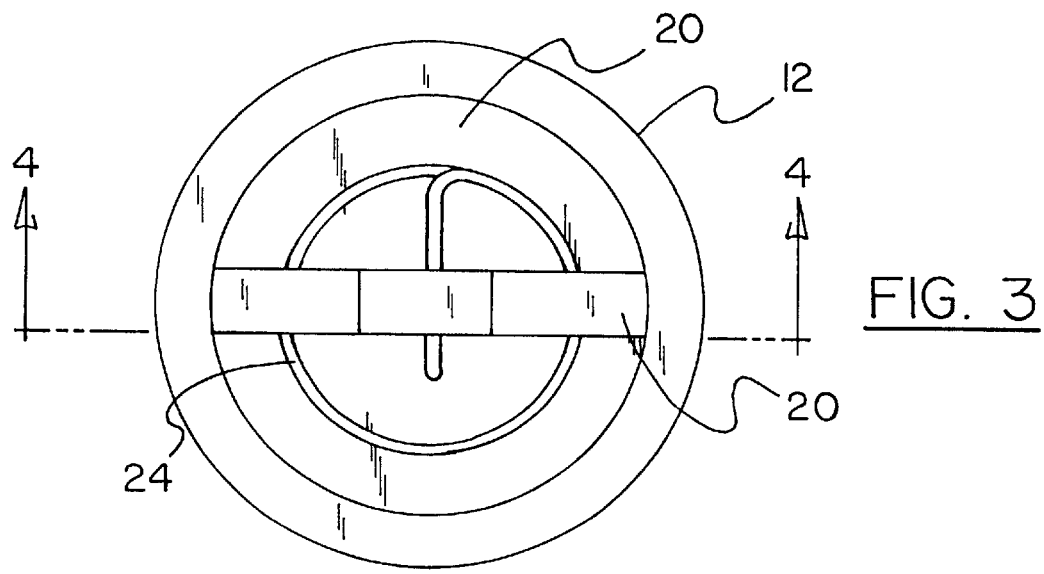
FIG. 3 is a top plan view of the present invention.
Figure 4:
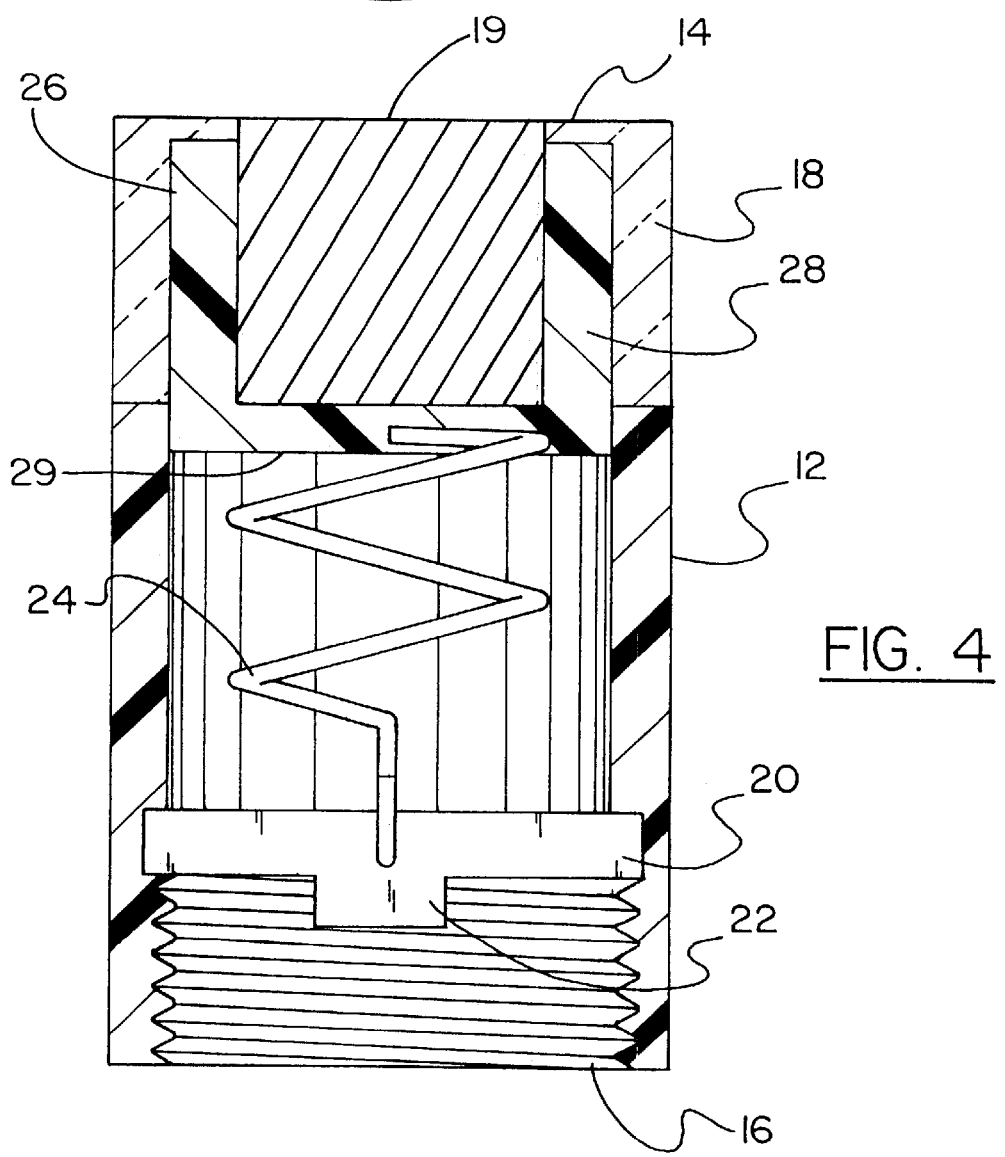
FIG. 4 is a cross-sectional view of the present invention as taken along line 4—4 of FIG. 3.
Figure 5:
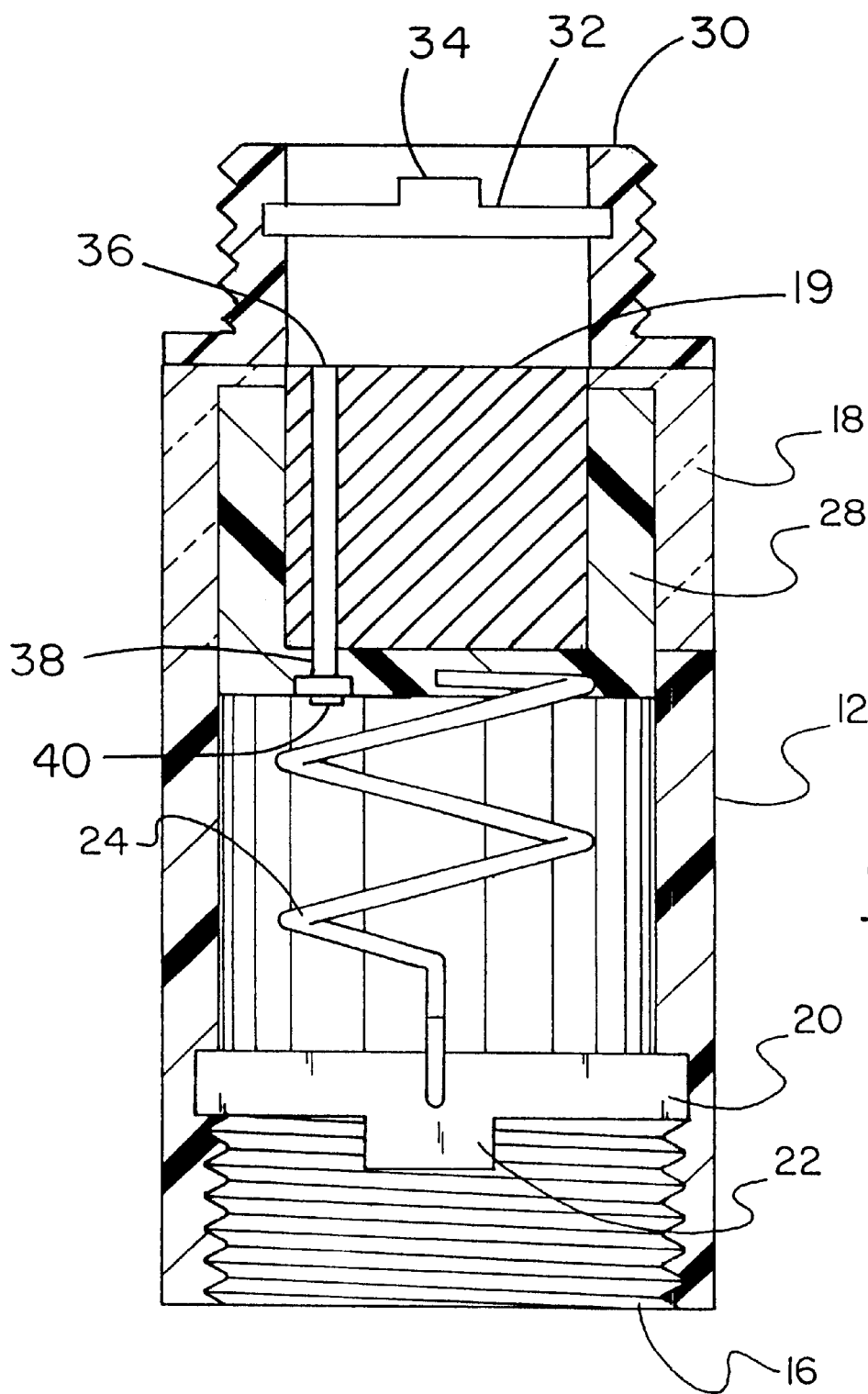
FIG. 5 is a cross-sectional view of an alternate embodiment of the present invention that permits adding air to a tire without removal of the gauge from the tire.

With reference now to the drawings, and in particular to FIGS. 1 through 5 thereof, a new automatic tire gauge embodying the principles and concepts of the present invention and generally designated by the reference numeral 10 will be described.

As best illustrated in FIGS. 1 through 5, the automatic tire gauge 10 comprises a cylindrical housing 12 having a closed upper end 14 and an open lower end 16. The open lower end 16 is internally threaded for mating with external threads on a standard tire valve stem. An outer portion 18 of the cylindrical housing 12 is transparent. An inner portion 19 has a first color shade on an exterior surface thereof.

A mounting bracket 20 is disposed inwardly of the open lower end 16 of the cylindrical housing 12. The mounting bracket 20 has a protrusion 22 extending downwardly therefrom for contacting a valve needle of the standard tire valve stem. The protrusion 22 depresses the valve needle, thereby opening the valve in the tire valve stem, when the gauge 10 is mounted to a tire valve stem.

A calibrated spring 24 is secured to and extends upwardly from the mounting bracket 20. The spring 24 has a calibrated tension corresponding to a specific tire pressure.

A pressure indicator 26 is secured to an upper free end of the calibrated spring 24. The pressure indicator 26 is comprised of a cylindrical member 28 disposed interiorly of the cylindrical housing 12. The cylindrical member 28 has a closed bottom 29 and a second shade of color disposed thereon. The cylindrical member 28 is biased upwardly in an extended orientation by air pressure from the tire for being viewed through the transparent outer portion 18 when the tire is properly pressurized. The cylindrical member 28 descends within the cylindrical housing 12 when the tire is not properly pressurized thereby exposing the first shade of color of the cylindrical housing 12.

In use, the present invention is operated by the amount of pressure exerted by the air inside the tire against the cylindrical member 28 and the counter-balancing force of the spring 24. The spring 24 would be produced or selected to counteract a particular common tire pressure. Thus, the present invention could be offered in a variety of different versions for tires which were supposed to be inflated to different pressures. The present invention is a two-color pressure indicator system which would be visible through the transparent outer portion 18. When the tire inflation pressure was at the correct amount, the second shade of color of the cylindrical member 28 would be shown. This color is preferably green. Once pressure decreases in the tire, the spring 24 will compress thereby allowing the cylindrical member 28 to slide downwardly thereby exposing the first shade of color of the cylindrical housing 12. This color is preferably red. Thus a driver may make a quick review of the gauges 10 before or after driving to determine whether the tires are properly inflated. Alternately, the cylindrical housing 12 could be provided with incremental lines or numbers to align with the cylindrical member 28 to indicate a pressure reading of the tire.

Optionally, a hollow stem 30 may extend from the upper end 14 of the cylindrical housing to permit inflation of the tire without removal of the gauge. The hollow stem may be threaded and should have the same approximate dimensions as the threaded portion of the valve tire stem. The hollow stem has a cross member 32 therein, which has a protrusion 34 for engaging a valve pin of an air hose. The inner portion of the housing would have a bore 36 therethrough and the pressure indicator would have an aperture 38 therethrough generally aligned with the bore of the housing and a one-way valve 40 for permitting passage of air through the aperture towards the lower end of the housing to permit inflation of a tire to which attached and preventing passage of air through the aperture towards the upper end of the housing. To inflate the tire, an air hose is simply attached to the hollow stem 30 just as it would be to a tire valve stem to inflate a tire.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic tire gauge for indicating levels of air pressure in a tire, comprising:

a cylindrical housing having an upper portion and a lower portion, said upper portion including a closed upper end and an upper peripheral wall extending downwardly therefrom; said lower portion including an open lower end and a lower peripheral wall extending upwardly therefrom, the open lower end being internally threaded for mating with external threads on a standard tire valve stem, an upper portion of the cylindrical housing being transparent, said upper and lower portions being environmentally coupled, said upper peripheral wall being coupled to said lower peripheral wall;

a mounting bracket disposed inwardly of the open lower end of the cylindrical housing, the mounting bracket having a protrusion extending downwardly therefrom for contacting a valve needle of the standard tire valve stem;

a calibrated spring secured to and extending upwardly from the mounting bracket; and a pressure indicator secured to an upper free end of the calibrated spring, the pressure indicator comprising a cylindrical member disposed interiorly of the housing, the cylindrical member being biased upwardly in an extended orientation for being viewed through the transparent outer portion when the tire is properly pressurized.

2. The automatic tire gauge of claim 1, wherein the housing has an inner portion, the cylindrical member descending within the cylindrical housing when the tire is not properly pressurized thereby exposing the inner portion of the cylindrical housing.

3. The automatic tire gauge of claim 2, wherein the inner portion has a first color shade on an exterior surface thereof.

4. The automatic tire gauge of claim 1, wherein the cylindrical member having a second shade of color disposed thereon.

5. The automatic tire gauge of claim 1, wherein the spring has a calibrated tension corresponding to a specific tire pressure.

6. The automatic tire gauge of claim 1, wherein the cylindrical member has pressure indicating indicia thereon.

7. The automatic tire gauge of claim 1, further comprising a hollow stem extending from the upper end of the cylindrical housing, the inner portion of the housing having a bore therethrough, the pressure indicator having an aperture therethrough and a one-way valve for permitting passage of air through the aperture towards the lower end of the housing to permit inflation of a tire and preventing passage of air through the aperture towards the upper end of the housing, said hollow stem having an outer diameter equal to an inner diameter of said open lower end.

8. The automatic tire gauge of claim 7, wherein the hollow stem has a cross member therein, the cross member having a protrusion for engaging a valve pin of an air hose.

* * * * *